(No Model.) 2 Sheets—Sheet 1.

J. H. BECKMANN.
SAFETY NUT FOR VALVES.

No. 409,553. Patented Aug. 20, 1889.

Attest:

Inventor:
J. Henry Beckmann (No Model.) 2 Sheets—Sheet 2.

J. H. BECKMANN.
SAFETY NUT FOR VALVES.

No. 409,553. Patented Aug. 20, 1889.

Attest:
E. Arthur
F. A. Hopkins

Inventor:
Jacob Henry Beckmann
By Knight & Bro.
Attys.

UNITED STATES PATENT OFFICE.

JACOB HENRY BECKMANN, OF ST. LOUIS, MISSOURI.

SAFETY-NUT FOR VALVES.

SPECIFICATION forming part of Letters Patent No. 409,553, dated August 20, 1889.

Application filed October 3, 1888. Serial No. 287,120. (No model.)

*To all whom it may concern:*

Be it known that I, JACOB HENRY BECKMANN, of the city of St. Louis, in the State of Missouri, have invented a certain new and useful Improvement in Safety-Nut for Valves, of which the following is a full, clear, and exact description, reference being had to the accompanying drawings, forming part of this specification.

My invention relates to a mechanical device primarily intended for application to the suction-valve in the compressor of a refrigerating or ice machine used for the reduction of temperature and manufacture of ice.

The purposes of the invention are to prevent the possibility of the valve dropping into the compressor and to cause the valve to work silently.

The points of novelty will be set forth in the claims.

Figure 1:
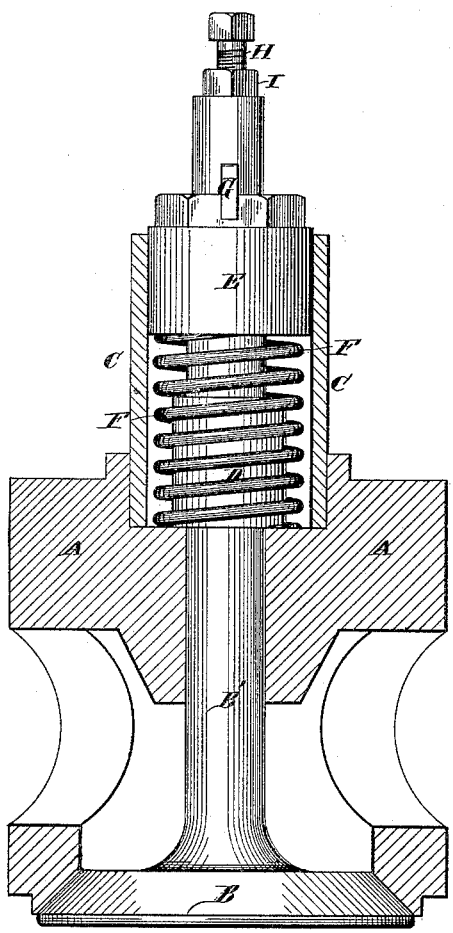
Figure 2:
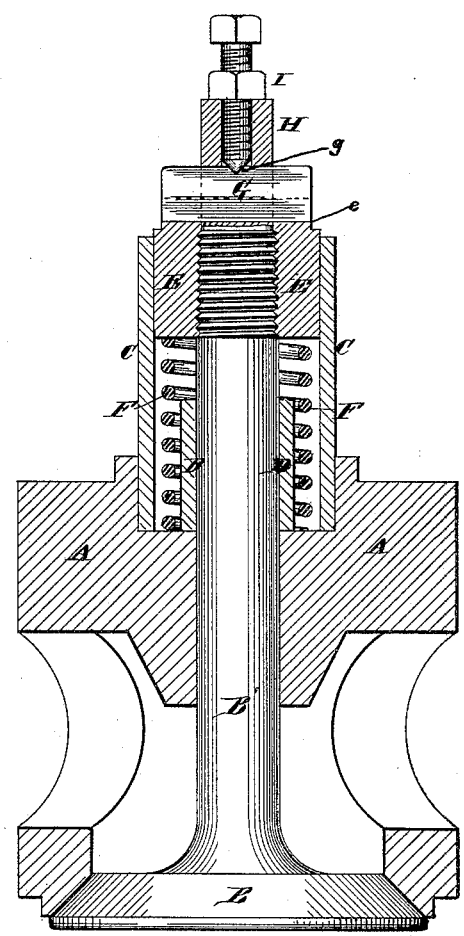
Figure 3:
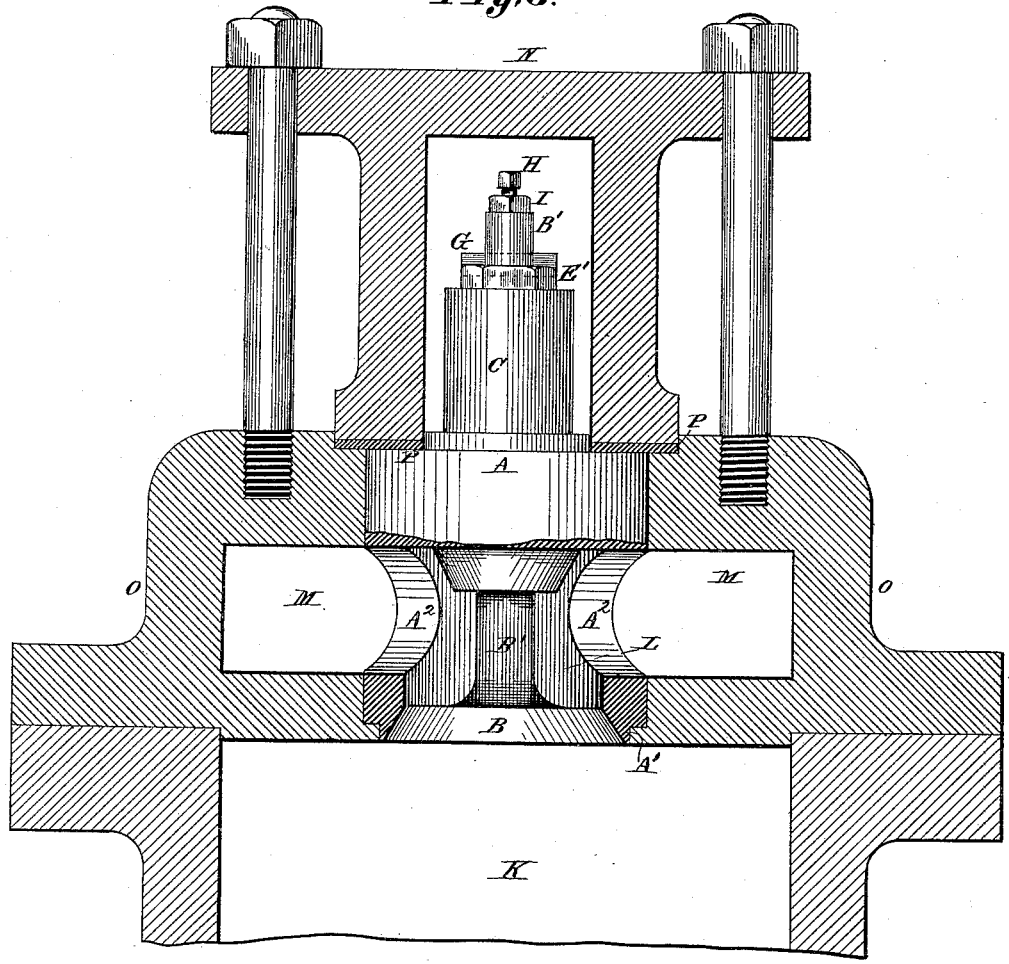

Figure 1 is an axial section of the improvement. Fig. 2 is a detail side elevation. Fig. 3 is a view showing the improvement in elevation with part broken away, and showing adjacent parts of the machine in axial section.

A is the body of the suction-valve.

B is the valve, and B' the valve-stem.

C is a cylinder screwed or otherwise made fast at its lower end in the body A.

D is a sleeve fitting easily the valve-stem, and whose outer circumference is less than the interior circumference of the cylinder C, leaving an annular space $c$ to receive the lower part of a spiral spring F.

E is a nut upon the screw-threaded part $b$ of the valve-stem, the nut E bearing upon the top of the spiral spring, and by this means the spring forces up the valve B to its seat A'. When the valve is open and the ammonia-gas passing into the compressor K, the nut E rests upon the top of the sleeve D, so as to limit the descent of the valve. This construction allows the use of a light spring, as the spring is not used to limit the opening of the valve, but merely to raise the valve to its seat when the pressure is equalized upon its top and bottom. Where, as heretofore, the spring has had sufficient power to limit the opening of the valve, the variations of pressure have caused the valve to vibrate to and from its seat, causing a disagreeable fluttering sound and causing considerable unnecessary wear in the parts.

The body of the safety-nut E fits easily the interior of the cylinder C, so that the cylinder forms a guide for it and the valve-stem. The upper part E' of the nut is made hexagonal or otherwise angular to receive a key by which the nut may be turned. There is a key-seat or slot $e$ made through the hexagonal part E' to receive a key G, which passes through a slot $b'$, made diametrically through the valve-stem.

$g$ is a notch which is made in the top of the key at its middle, which receives the end of a set-screw H, which is axially screw-threaded in the top of the valve-stem. The point of the set-screw is preferably tempered.

I is a jam-nut on the set-screw, which is screwed down upon the top of the stem to hold the set-screw rigid.

It will be seen that the key will prevent the turning of the nut and the set-screw prevent the movement of the key.

The ammonia-gas enters the chamber L above the valve through passages $A^2$ in the body A, said passages communicating with the passage M.

N is a casing or cap, of usual construction, which incloses the upper part of the improved device. The cap is hermetically connected with the top of the main case O by a rubber or other gasket P. No novelty is claimed in this cap *per se*.

The cap N prevents the escape of the key G from the slots in the nut and valve-stem in case the set-screw should come loose, as one end of the key will come in contact with the cap before its other end escapes from the slot of the valve-stem.

I claim as my invention—

1. The combination of a valve-stem B', having a key-slot $b'$, a nut E, having key-seat $e$ and screw-threaded on the valve-stem, a key G, occupying the said slot and seat and having a notch $g$, and a set-screw H, threaded in the valve-stem and engaging in the notch of the key, for the purpose set forth.

2. The combination of the valve-stem B', with key-slot $b$ through it, and screw-hole leading from the top of the stem into the slot, set-screw occupying the screw-hole and carrying a jam-nut, a nut screwing upon the stem and having a key-seat in its top, a key fitting the key-seat and slot and having a notch to receive the end of the set-screw, a cylinder surrounding the nut and forming a guide therefor, a sleeve D, surrounding the valve-stem and forming a stop for the nut, and a spring surrounding the sleeve and bearing against the bottom of the nut, substantially as and for the purpose set forth.

3. The combination, with the body A, valve-seat, and valve B, having stem B', of a cylinder secured to the body around the valve-stem, a removable sleeve D, surrounding the valve-stem within the cylinder, a nut secured to the valve-stem and fitting snugly in the cylinder, forming a guide for said stem and adapted to come against the sleeve D to limit the opening of the valve, and a spiral spring located between said sleeve and cylinder and bearing between said nut and the body A, said sleeve being of sufficient length to project above the spring when the latter is compressed, substantially as set forth.

J. HENRY BECKMANN.

Witnesses:
RICHARD KING,
ALBERT J. KIPPER.